(12) United States Patent
Zhang et al.

(10) Patent No.: US 10,240,484 B2
(45) Date of Patent: Mar. 26, 2019

(54) GAS ACCUMULATION DETECTION AND VENTILATION IN A GAS TURBINE ENCLOSURE

(71) Applicant: General Electric Company, Schenectady, NY (US)

(72) Inventors: Hua Zhang, Greenville, SC (US); Manuel Moises Cardenas, Jr., Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 711 days.

(21) Appl. No.: 14/934,806

(22) Filed: Nov. 6, 2015

(65) Prior Publication Data

US 2017/0130607 A1 May 11, 2017

(51) Int. Cl.
| | | |
|---|---|---|
| *F01D 25/24* | (2006.01) | |
| *B08B 15/02* | (2006.01) | |
| *F01D 21/14* | (2006.01) | |
| *G01M 15/14* | (2006.01) | |
| *G01M 3/02* | (2006.01) | |
| *G01M 3/16* | (2006.01) | |

(52) U.S. Cl.
CPC .............. *F01D 25/24* (2013.01); *B08B 15/02* (2013.01); *F01D 21/14* (2013.01); *G01M 3/025* (2013.01); *G01M 3/16* (2013.01); *G01M 15/14* (2013.01); *F05D 2220/32* (2013.01); *F05D 2260/608* (2013.01); *F05D 2260/83* (2013.01); *F23M 2900/11021* (2013.01)

(58) Field of Classification Search
CPC ......... F01D 25/24; F01D 21/14; B08B 15/02; G01M 3/04; G01M 3/025; G01M 3/16; G01M 15/14; F05D 2260/608; F05D 2260/83; F02K 9/38
See application file for complete search history.

(56) References Cited

U.S. PATENT DOCUMENTS

| | | | | |
|---|---|---|---|---|
| 6,477,843 B2 * | 11/2002 | Schroeder | ............... | F01D 25/12 60/772 |
| 6,962,057 B2 * | 11/2005 | Kurokawa | ............... | F01D 25/24 248/646 |
| 6,983,607 B2 * | 1/2006 | Grove | ..................... | F01D 25/14 60/39.83 |

(Continued)

OTHER PUBLICATIONS

Extended European Search Report and Opinion issued in connection with corresponding EP Application No. 16196556.1 dated Apr. 11, 2017.

*Primary Examiner* — Steven Sutherland
(74) *Attorney, Agent, or Firm* — Nixon & Vanderhye P.C.

(57) ABSTRACT

A gas accumulation detection and ventilation system for a gas turbine enclosure includes a pipe array positioned adjacent a floor of the gas turbine enclosure and a ventilation assembly including a fan, an air flow inlet and an air flow outlet. The pipe array includes at least one pipe having at least one opening therein. The fan of the ventilation assembly directs an air flow sweep through the air flow inlet along the floor of the gas turbine enclosure. A hazardous gas sensor panel in communication with the pipe array and the ventilation assembly detects an accumulation level of turbine fuel gas in the gas turbine enclosure based on input from the pipe array and activates the ventilation assembly according to the detected accumulation level.

18 Claims, 2 Drawing Sheets

(56) References Cited

U.S. PATENT DOCUMENTS

| | | | |
|---|---|---|---|
| 8,210,316 B2 | 7/2012 | DiBenedetto et al. | |
| 2015/0056912 A1* | 2/2015 | Scipio | F24F 11/053 |
| | | | 454/258 |
| 2015/0226129 A1* | 8/2015 | Byrd | F02C 7/25 |
| | | | 60/779 |
| 2015/0308915 A1 | 10/2015 | Konatham et al. | |

* cited by examiner

GAS ACCUMULATION DETECTION AND VENTILATION IN A GAS TURBINE ENCLOSURE

BACKGROUND OF THE INVENTION

The invention relates to a gas accumulation detection and ventilation system for a gas turbine enclosure.

A conventional gas turbine system includes a compressor, a combustor, and a turbine. In a conventional gas turbine system, compressed air is provided from the compressor to the combustor. The air entering the combustor is mixed with fuel and combusted. Hot gases of combustion flow from the combustor to the turbine to drive the gas turbine system and generate power.

Gas turbines are generally housed in enclosures, which include various features for protecting and maintaining the systems. A typical prior art enclosure includes a roof or top wall bolted to four sidewalls about the periphery of the roof with a plurality of nut/bolt fasteners. The roof and sidewalls thus form a generally hollow, rectangular enclosure.

Heavier gas fuel for gas turbines needs special consideration because of safety concerns as heavier gas fuels, such as propane, butane, etc. may accumulate on the floor of the gas turbine enclosure. The gas turbine includes many pipes and connections for delivering fuel to the gas turbine, resulting in potential leak points within the enclosure.

Existing ventilation systems create airflow through the gas turbine enclosure, but the systems typically do not focus inlet flow on the enclosure floor nor do they provide for sufficient ventilation to extract heavier fuels. This is because natural gas is slightly lighter than air, and thus tends to buoyance up. Existing systems include a sensor or plural sensors in an air exhaust duct to detect fuel molecules in the air exhaust. If a leakage is detected by the sensors, the gas turbine control system will alarm or trip the machine shut down, depending on the level of fuel gas leakage.

It would be desirable to detect leak accumulation adjacent the floor of a gas turbine and to configure a more effective ventilation system.

BRIEF SUMMARY OF THE INVENTION

In an exemplary embodiment, a gas accumulation detection and ventilation system for a gas turbine enclosure includes a pipe array positioned adjacent a floor of the gas turbine enclosure and a ventilation assembly including a fan and air flow outlet and an air flow inlet. The pipe array includes at least one pipe having at least one opening therein. The fan of the ventilation assembly directs an air flow sweep through the air flow inlet along the floor of the gas turbine enclosure. A hazardous gas sensor panel in communication with the pipe array and the ventilation assembly detects an accumulation level of turbine fuel gas in the gas turbine enclosure based on input from the pipe array and activates the ventilation assembly according to the detected accumulation level.

In another exemplary embodiment, a gas accumulation detection and ventilation system for a gas turbine enclosure includes a pipe array positioned adjacent a floor of the gas turbine enclosure, where the pipe array has a plurality of pipes, each of which having a plurality of inlet openings therein. A suction device is coupled with the pipe array and draws a vacuum on the pipe array to siphon an environmental sample from the gas turbine enclosure via the pipe array. A ventilation assembly includes a fan and air flow outlet and an air flow inlet. The fan directs an air flow sweep through the air flow inlet along the floor of the gas turbine enclosure. A hazardous gas sensor panel in communication with the pipe array and the ventilation assembly detects an accumulation level of turbine fuel gas in the gas turbine enclosure based on input from the pipe array and activates the ventilation assembly according to the detected accumulation level.

In still another exemplary embodiment, a method of detecting and ventilating a gas turbine enclosure includes the steps of (a) positioning a pipe array adjacent a floor of the gas turbine enclosure, the pipe array including a plurality of pipes, each of the pipes having a plurality of inlet openings therein; (b) drawing a vacuum on the pipe array and siphoning an environmental sample from the gas turbine enclosure via the pipe array; (c) detecting an accumulation level of turbine fuel gas in the gas turbine enclosure based on input from the pipe array in step (b); and (d) activating a ventilation assembly according to the detected accumulation level by directing an air flow sweep along the floor of the gas turbine enclosure.

DETAILED DESCRIPTION OF THE INVENTION

Figure 1:
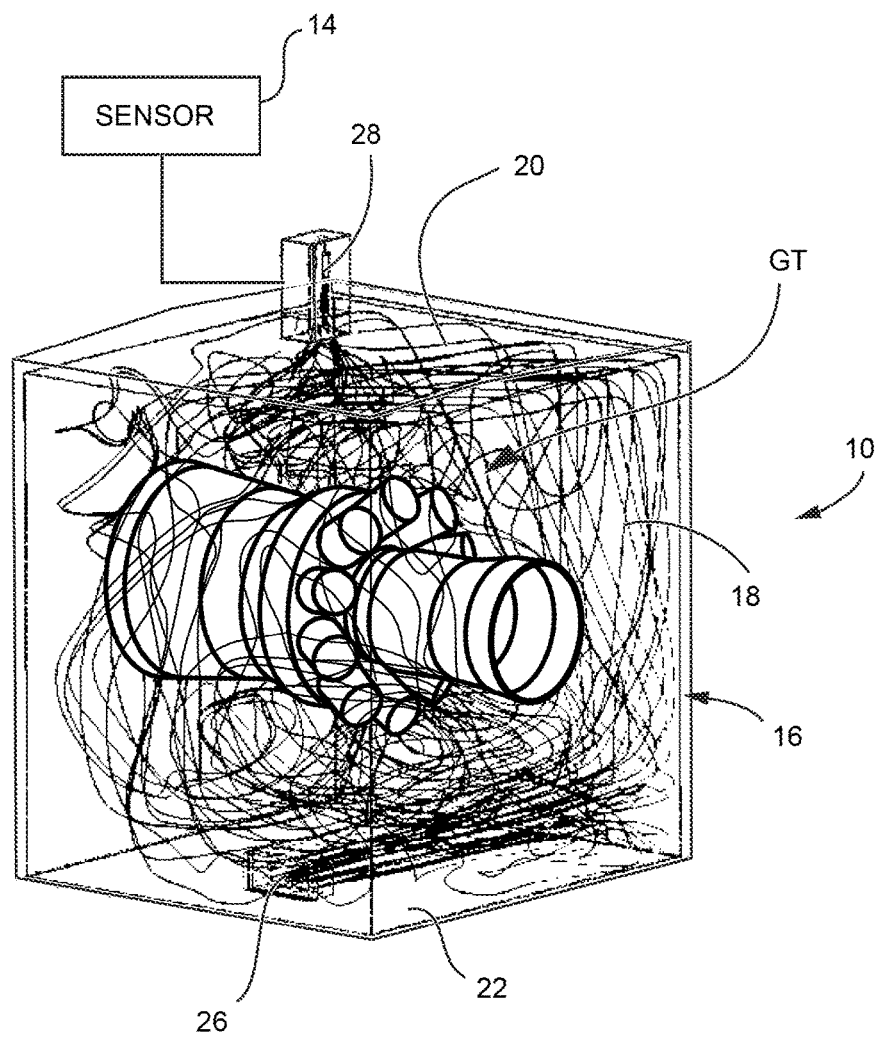
FIG. 1 is a schematic illustration of a gas turbine disposed in a gas turbine enclosure.

With reference to the drawings, the system embodies an enclosure ventilation configuration 10 (FIG. 1), a sampling pipe array 12 (FIG. 2) and a hazardous gas sensor panel 14. The sensor panel 14 is known, and additional details thereof will not be further described. Any suitable hazgas sensor may be used. The gas turbine enclosure 16 includes sidewalls 18, a top wall 20, and a floor 22. The gas turbine GT is disposed within the enclosure 16.

Figure 2:
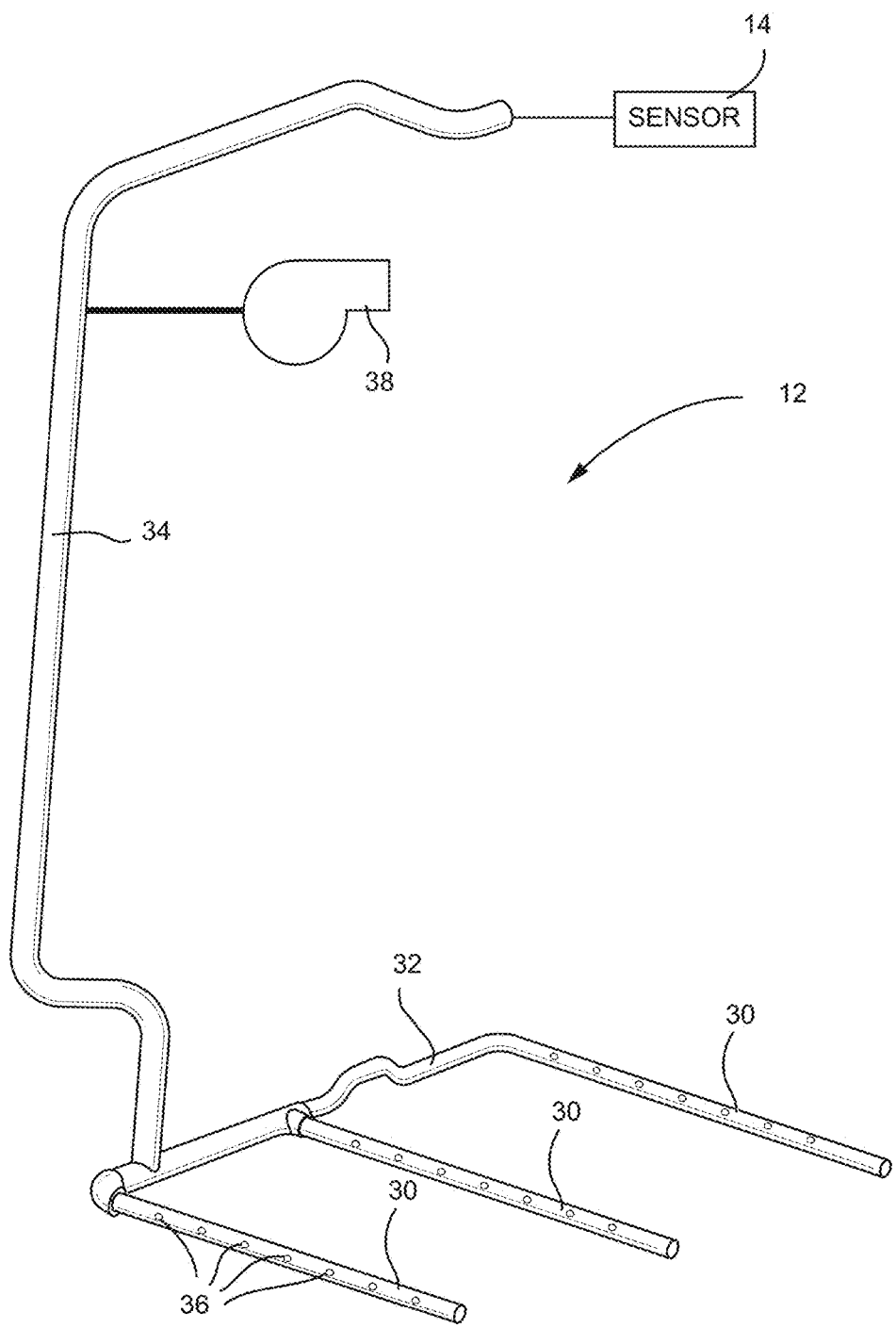
FIG. 2 shows an exemplary pipe array positionable within the gas turbine enclosure.

The ventilation assembly includes an airflow inlet 26, and a fan/airflow outlet 28. The fan 28 and the airflow inlet 26 direct an airflow sweep through the airflow inlet 26 along the floor 22 of the gas turbine enclosure 16. In FIG. 1, the combined fan/airflow outlet 28 are combined as a single unit, but these may be separately provided. It is preferable for the fan to be located at the outlet duct.

With continued reference to FIG. 1, the airflow inlet 26 may be positioned in a wall 18 of the gas turbine enclosure 16 adjacent the floor 22 of the gas turbine enclosure 16. The airflow inlet 26 is configured to direct air flow along the floor 22 of the gas turbine enclosure 16. As shown in FIG. 1, the airflow outlet may be positioned in the top wall 20 of the gas turbine enclosure 16. As an example, the fan 28 may have 10 to 20 KCFM, powered an AC motor that consumes 20 to 100 kW. The fan 28 may create a negative pressure (suction) inside the enclosure in the range of −1.0 to −6.0 inches of water column.

The pipe array 12 is configured to be positioned within the enclosure 16 adjacent or supported on the floor 22 of the enclosure 16. The pipe array 12 includes one or a plurality of pipes 30 (three shown in FIG. 2) connected in parallel via a parallel pipe 32 to a return pipe 34. Each of the pipes 30 includes one or several openings 36. A suction device 38 is coupled with the pipe array 12 and draws a vacuum on the pipe array 12. Any suitable ejector as suction device may be used, and in a preferred embodiment, the suction device is sized to draw about 1 to 10 CFM air form the enclosure into the pipe array.

When the suction device 38 is activated, the pipe array 12 siphons an environmental sample/air from the gas turbine enclosure 16. The siphoned air is delivered via the return pipe 34 to the hazardous gas sensor panel 14. The hazardous gas sensor panel 14 detects an accumulation level of turbine fuel gas in the gas turbine enclosure based on input from the pipe array 12. When the sensor panel 14 detects that the accumulation level exceeds a predetermined threshold, the sensor panel 14 trips or activates the ventilation assembly. If the sensor panel 14 detects a certain hazgas concentration level, for example 5% of LEL, then the control system will alarm, while if it reaches a higher level, for example 10% of LEL concentration, then the control system will trip the gas turbine.

The enclosure configuration provides a sufficient velocity and velocity distribution in the ventilation system on the enclosure floor so that any accumulation of heavier fuel gas can be expunged or ventilated out of the enclosure. The sampling pipes and the hazardous gas sensors are used to control the ventilation fan in the case of the detection of any significant amount of accumulation to ensure safe operation of the gas turbine.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A gas accumulation detection and ventilation system for a gas turbine enclosure, the gas accumulation detection and ventilation system comprising:
    a pipe array positioned adjacent a floor of the gas turbine enclosure, the pipe array including at least one pipe having at least one opening therein;
    a ventilation assembly including a fan and air flow outlet and an air flow inlet, wherein the fan is configured to direct an air flow sweep through the air flow inlet along the floor of the gas turbine enclosure; and
    a hazardous gas sensor panel in communication with the pipe array and the ventilation assembly, the hazardous gas sensor panel being configured to detect an accumulation level of turbine fuel gas in the gas turbine enclosure based on input from the pipe array and to activate the ventilation assembly when the accumulation level exceeds a predetermined threshold.

2. The system according to claim 1, wherein the pipe array comprises a plurality of pipes.

3. The system according to claim 2, wherein the plurality of pipes each comprises a plurality of openings therein.

4. The system according to claim 2, wherein the pipe array comprises three pipes.

5. The system according to claim 4, wherein the three pipes of the pipe array are connected in parallel with a return pipe that is configured to deliver siphoned air from the gas turbine enclosure to the hazardous gas sensor panel.

6. The system according to claim 1, wherein the at least one pipe comprises a plurality of openings therein.

7. The system according to claim 1, further comprising a suction device coupled with the pipe array, the suction device being configured to draw a vacuum on the pipe array.

8. The system according to claim 7, wherein the suction device is sized to draw 1 to 10 CFM into the pipe array.

9. The system according to claim 1, wherein the air flow inlet is positioned in a wall of the gas turbine enclosure adjacent the floor of the gas turbine enclosure.

10. The system according to claim 9, wherein the air flow inlet is configured to direct air flow along the floor of the gas turbine enclosure.

11. The system according to claim 9, wherein the air flow outlet is positioned in a top of the gas turbine enclosure.

12. A gas accumulation detection and ventilation system for a gas turbine enclosure, the gas accumulation detection and ventilation system comprising:
    a pipe array positioned adjacent a floor of the gas turbine enclosure, the pipe array including a plurality of pipes, each of the plurality of pipes having a plurality of inlet openings therein;
    a suction device coupled with the pipe array, the suction device being configured to draw a vacuum on the pipe array and to siphon an environmental sample from the gas turbine enclosure via the pipe array;
    a ventilation assembly including a fan and air flow outlet and an air flow inlet, wherein the fan is configured to direct an air flow sweep through the air flow inlet along the floor of the gas turbine enclosure; and
    a hazardous gas sensor panel in communication with the pipe array and the ventilation assembly, the hazardous gas sensor panel being configured to detect an accumulation level of turbine fuel gas in the gas turbine enclosure based on input from the pipe array and to activate the ventilation assembly when the accumulation level exceeds a predetermined threshold.

13. The system according to claim 12, wherein the pipe array comprises three pipes.

14. The system according to claim 12, wherein the plurality of pipes of the pipe array are connecting in parallel with a return pipe that delivers siphoned air from the gas turbine enclosure to the hazardous gas sensor panel.

15. The system according to claim 12, wherein the air flow inlet is positioned in a wall of the gas turbine enclosure adjacent the floor of the gas turbine enclosure.

16. The system according to claim 15, wherein the air flow inlet is configured to direct air flow along the floor of the gas turbine enclosure.

17. The system according to claim 15, wherein the air flow outlet is positioned in a top of the gas turbine enclosure.

18. A method of detecting and ventilating a gas turbine enclosure, the method comprising:
    (a) positioning a pipe array adjacent a floor of the gas turbine enclosure, the pipe array including a plurality of pipes, each of the plurality of pipes having a plurality of inlet openings therein;
    (b) drawing a vacuum on the pipe array and siphoning an environmental sample from the gas turbine enclosure via the pipe array;
    (c) detecting an accumulation level of turbine fuel gas in the gas turbine enclosure based on input from the pipe array in step (b); and
    (d) when the accumulation level detected in step (c) exceeds a predetermined threshold, activating a ventilation assembly according to the accumulation level by directing an air flow sweep along the floor of the gas turbine enclosure.

* * * * *